E. W. LILJEGRAN.
CONDENSER.
APPLICATION FILED MAR. 5, 1920.
1,434,301.
Patented Oct. 31, 1922.
2 SHEETS—SHEET 1.
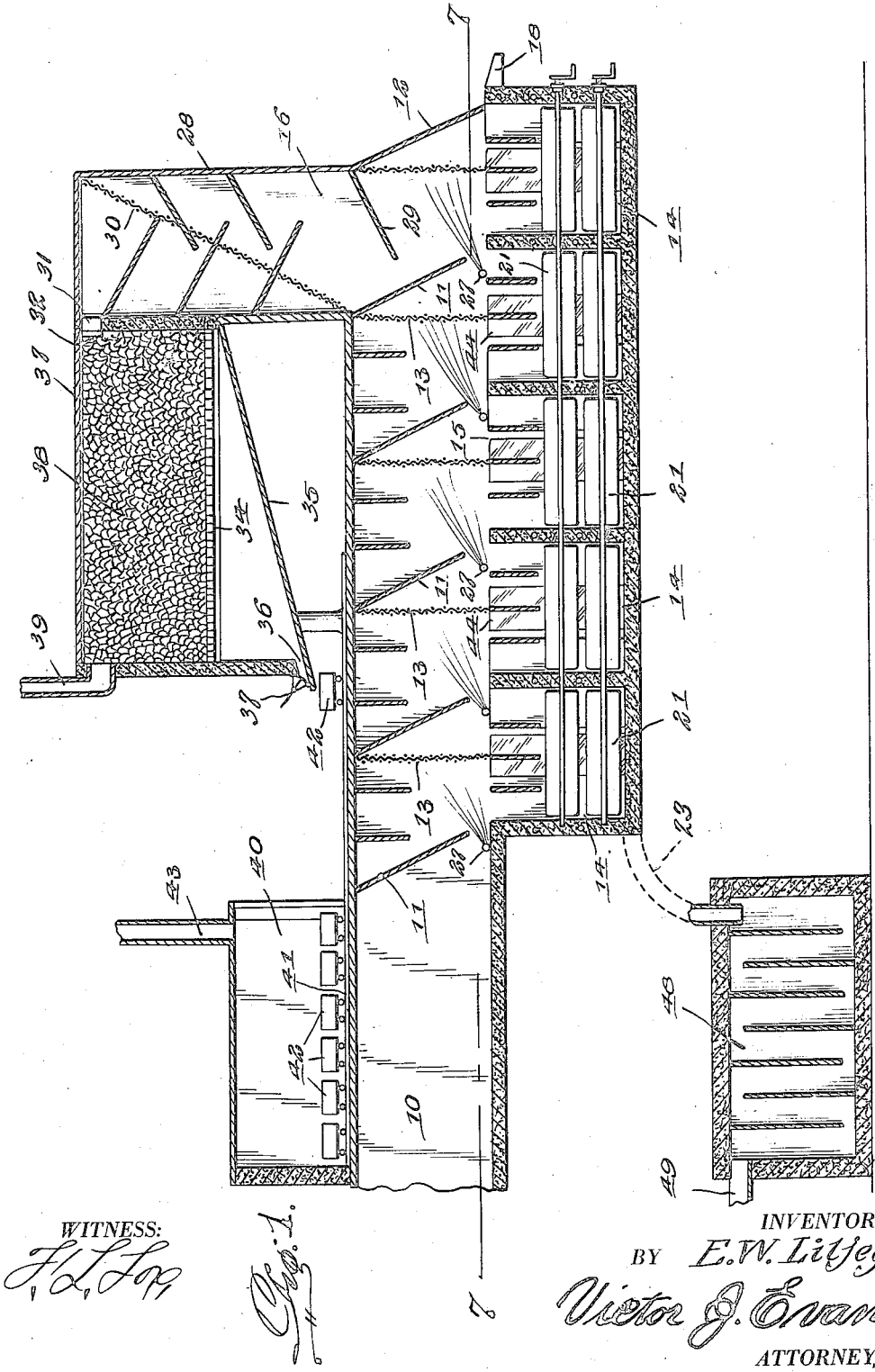
WITNESS:
INVENTOR.
BY E. W. Liljegran.
ATTORNEY.

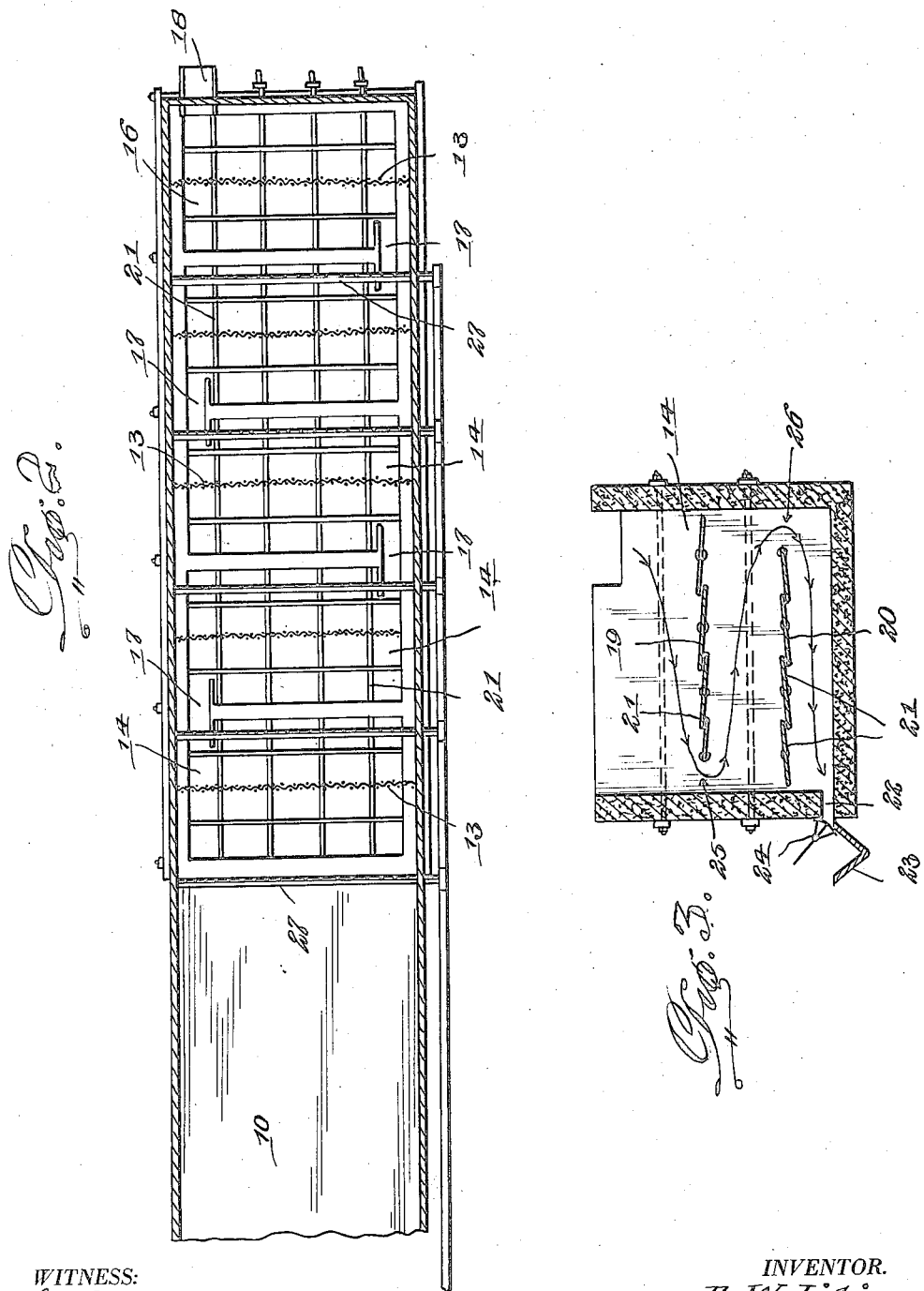

Patented Oct. 31, 1922.

1,434,301

UNITED STATES PATENT OFFICE.

ERNEST W. LILJEGRAN, OF MEDFORD, OREGON.

CONDENSER.

Application filed March 5, 1920. Serial No. 363,414.

*To all whom it may concern:*

Be it known that I, ERNEST W. LILJEGRAN, a citizen of the United States, residing at Medford, in the county of Jackson and State of Oregon, have invented new and useful Improvements in Condensers, of which the following is a specification.

This invention has reference to a fume arrester.

An object of the invention is to produce a means for recovering fumes and dust from smelters, retorts, roaster or other fume, smoke or dust producing apparatus, for recovering metal substances therefrom and for converting the sulphuric acid carried by the fumes into a fertilizer, and other commercial substances.

The foregoing objects, and others which will appear as the nature of the invention is better understood may be accomplished by a construction, combination and operative arrangement of elements such as is disclosed by the drawings, the nature of the invention, however, rendering the same susceptible to various changes and modifications with respect to the details thereof, all of which, however, falling within the scope of what is claimed.

In the drawings:

Figure 1 is an approximately central vertical longitudinal sectional view through the device.

Figure 2 is a horizontal sectional view approximately on the line 7—7 of Figure 1.

Figure 3 is a transverse sectional view through one of the settling tanks showing the sections comprising the floors from tilted to a vertical position.

Connected to the smoke outlet pipe from a furnace such as a smelter, retort, roaster or the like is a flue 10 which forms a part of this invention. In the flue, suspended from the top, connected thereto as well as connected to the sides are angularly arranged baffle plates 11. These baffle plates terminate a suitable distance from the bottom wall of the flue, and the spaces between the baffle plates in the flue constitute chambers. Any desired number of these chambers may be employed, five of which being illustrated by the drawings. The rear wall of the flue is arranged at an angle in a line with the horizontal passage thereof, and in reality provides an additional baffle plate which is designated by the numeral 12. Between all of the baffle plates, except the baffle plate nearest the front of the flue there are secured baffle screens 13.

By reference to the drawings it will be seen that all of the compartments are open at the lower walls thereof and communicate with settling tanks 14. One of the settling tanks 14 is provided for each of the compartments.

The settling tanks 14, while preferably arranged in a battery as disclosed by the drawings may and preferably have communication one with the other so that the water from one of the tanks may flow into the remaining tanks. The water is caused to take a circuitous path of travel by arranging the openings between the tanks staggered with respect to each other, so that the opening 17 between the first and second tank is arranged at one side thereof and the opening between the second and third tank is arranged adjacent to the opposite side thereof, etc., the outer or end tank being provided with an overflow spout which is designated by the numeral 18.

In the tanks are horizontally disposed floors 19 and 20 respectively. Each of these floors is made up of a number of centrally pivoted sections 21, and the pivots therefor may pass through stuffing boxes at one end of the respective tanks and the said ends provided with handles whereby the sections 21 may be tilted.

The tilted sections are retained in a vertical position while particles are settling in the tanks, and the said sections are thrown into horizontal position just before the water is drawn off the sludge, so that the water will have a movement across the full width of the tank only and thus avoid drawing off more water than is absolutely necessary to convey the sludge into the trough. The tanks, at one of the sides thereof, and in a line with their lower walls or floors are provided with outlets 22 which communicate with a trough 23. The outlets are controlled by lever operated gate valves 24. By reference to the drawings it will be seen that one of the end sections of each of the floors 19 and 20 are arranged a considerable distance away from the opposite sides of the tanks, that is, one of the sections of the upper floor 19 is approximately half the width of the other section which is also true with respect to one of the end sections of the lower floor and the said reduced sections are positioned away from the opposite side walls of the tanks. In this manner the sludge entering the settling tanks will, in the main be deposited upon the upper floor 19, but a portion thereof will drop onto the lower floor 20. When the gate 24 is opened and the floors are in their normal horizontal position the water in the tanks will be caused to take a circuitous path of travel between the passage 25 provided by the upper floor 19 and the diagonally opposed passage 26 provided by the lower floor 20 which also causes the major portion of the sludge to be washed from the upper floor onto the lower floor and from thence onto the bottom of the tank, so that the said sludge is thoroughly washed before entering the trough 23.

The sludge is in the nature of the metallic substances that pass with the products of combustion through the flue tank, such substances contacting with the screen 13 and with the baffle plates 11, which, as stated, are arranged directly over the settling tanks.

Arranged transversely directly below the inclined baffle plate 11 of each of the compartments is a perforated pipe 27 and each of the said pipes has one of its ends closed. The pipes 27 are connected to a water supply which is under pressure, and the said pipes 27 are provided with minute perforations so arranged as to direct the water in a thin spray against the screens 13 and the baffle plates 11. These sprays of water act as a suction for forcing the air and smoke from the flue into the absorption chambers, the screens serving to break large particles of water and air that pass therethrough and together with the baffle plates serve as surfaces for washing the fumes that pass into the absorption chambers.

The end condensing chamber or compartment 16 has its wall 12 connected to a vertical pipe or flue 28. At the connection between the wall 12 and the outer wall of the vertical end 20 of the flue is a baffle plate 29, and connected between the upper and outer corner of the vertical passage of the flue and the inner and lower corner thereof is a screen baffle 30 similar to the screens 13. The vertical extension 28 of the flue 10 has a vent or opening 31, provided with a grate 32. This vent or opening communicates with a receptacle 33 that has a grated bottom 34 and below the grate is an angularly disposed trap drain 35. The drain has its outer end provided with an opening 36 which is closed by a lever operated door 37. The receptacle 33 is filled with crushed limestone, indicated by the numeral 38 and the said receptacle or chamber 33 at the upper end thereof is provided with an air vent 39.

Over the flue 10 and outward of the compartments 15 is a drying chamber 40. On the floor of the drying chamber are rails 41 on which travel wheeled cars 42, the same being moved beneath the outlet 36 for the trap or drain 35, and when the door 37 is opened the calcium sulphate and calcium sulfite will gravitate into the car, and thereafter the car is moved into the drying chamber 40. The drying chamber is provided with a vapor outlet pipe 43.

Each of the settling tanks 14 has its sides provided with openings which are closed by transparent plates 44, whereby an operator may observe the accumulation of sludge in the tanks.

The liquid from trough 23 flows into one or more tanks 48, which may constitute electrolytic cells if desired. Any number of the precipitating tanks may be employed, but all are connected together by the pipes 49, except, of course, the outermost tank, and the water from the last mentioned tank may be directed into a reservoir that is filled with crushed limestone so that the acid from the tank will be neutralized thereby. The excess water in the reservoir will be permitted to evaporate at its leisure, and the calcium sulfate in the reservoir, as well as that delivered from the chamber 38 is, of course, employed as a fertilizer, and the metals recovered by my process may be briquetted and returned to the furnace. With my improvement a smelter, instead of being a menace to vegetable growth in the vicinity of the device, by the aid of the fertilizer obtained, stimulates such growth.

The baffle plates in the top of the fume condensing chamber and also in the precipitating tanks extend from above the surface of the water at any desired depth. This is to insure the submerging of the particles so they will not flow away on the surface of the water, as the water falling into the tanks will have to flow to the outlet by passing under the water baffles. These baffles may be made of any desired material, either wood or metal. By using amalgamating surfaces, such as will hold the mercury when brought into contact with the amalgamated or amalgamating surfaces, tin plate or any other suitable substance that will collect the mercury from fumes in either the fume chambers or in the settling tanks will assist in recovering the metallic substances from the fume chambers.

Having thus described the invention, what is claimed as new, is:—

A fume arrester structure comprising a substantially horizontal flue for leading in the gases from a furnace, a series of obliquely arranged baffle plates therein, a series of foraminous screen-members arranged intermediate said baffles, a series of sprayers adapted to spray liquid upon said screen-members, a liquid receiving tank located below said baffles and screens and in communication with said flue, an upwardly extending conduit connected with said flue and baffles located therein, angularly adjustable baffles located in said tanks, such baffles when in one position forming a horizontal partition in said tank through a large portion of the tank area and a controllable exit for liquid from said tank.

In testimony whereof I affix my signature.

ERNEST W. LILJEGRAN.